Patented Dec. 2, 1952

2,620,329

UNITED STATES PATENT OFFICE 2,620,329

3,4-DIMETHYL STYRENE-PARA-CHLORO-STYRENE COPOLYMER

Robert R. Dreisbach, Midland, Mich., assignor to The Dow Chemical Company, Midland, Mich., a corporation of Delaware No Drawing. Application April 9, 1949, Serial No. 86,593

2 Claims. (Cl. 260—87.5)

This invention concerns new thermoplastic copolymers composed for the most part of ar-dimethylstyrene, but having mechanical properties superior to those of poly-ar-dimethylstyrene, or of polystyrene, which has been prepared under similar polymerization conditions. It relates more particularly to copolymers of ar-dimethylstyrene and para-chlorostyrene.

The new copolymers are prepared by polymerizing ar-dimethylstyrene together with from 0.5 to 3 per cent by weight of para-chlorostyrene. The copolymers are clear, transparent, colorless thermoplastic solids which may be molded, extruded, or machined to obtain finished articles of desired size and shape. They possess good dielectric properties and are useful as electric insulating agents. They are soluble in organic liquids such as toluene, xylene, carbon tetrachloride, or ethylene dichloride, etc. The copolymers have a luster and clarity similar to that of the usual solid form of polystyrene. However, they resist distortion under a transversely applied load at temperatures higher than does polystyrene which has been prepared in a similar manner, and they are superior to the polystyrene in one or more mechanical properties such as impact strength, tensile strength, hardness, i. e. resistance to scratching, etc. Accordingly, the new copolymers are better adapted for many purposes than is polystyrene.

The invention is based upon a discovery that by admixing a small amount of para-chlorostyrene with ar-dimethylstyrene prior to polymerizing the latter, products may be obtained having a higher heat-distortion temperature and improved mechanical properties over those obtained by polymerizing ar-dimethylstyrene alone, or by polymerizing styrene alone, under like conditions. However, in order to obtain such improved properties, it is important that the polymerization mixture contain not more than 3 per cent by weight of para-chlorostyrene, based on the combined weight of the ar-dimethylstyrene and the para-chlorostyrene.

In general, the heat-distortion temperature becomes lower and the mechanical properties of the copolymer products become poorer as the proportion of para-chlorostyrene chemically combined therein is decreased from 0.5 per cent to zero, or is increased above 3 per cent, e. g. from 3 up to 15 per cent by weight. Within the limits of from 0.5 to 3 per cent by weight of the para-chlorostyrene the copolymers are superior, as regards one or more of the aforementioned properties, to poly-ar-dimethylstyrene, or to polystyrene, and the properties are optimum when the product contains about one per cent of para-chlorostyrene interpolymerized with the ar-dimethylstyrene.

The copolymeric products are prepared by adding the para-chlorostyrene to ar-dimethylstyrene in amount such as to form a mixture containing from 0.5 to 3 per cent by weight of the para-chlorostyrene, based on the combined weight of the polymerizable compounds. The mixture may be polymerized in any of the usual ways such as by heating the same, or by exposure to actinic light, or by forming an aqueous emulsion of the polymerizable compounds and polymerizing the latter while in the emulsion, etc. The polymerization reaction may be accelerated by adding to the starting mixture a small amount, e. g. from 0.05 to 5 per cent by weight, of a peroxygen compound such as benzoyl peroxide, lauroyl peroxide, tertiary-butyl-hydroperoxide, di-tertiary-butylperoxide, tertiary-butyl-perbenzoate, or di-tertiary-butyl-diperphthalate, etc. Usually, the mixture of polymerizable compounds is heated in a closed container, e. g. at temperatures of from 70° to 150° C. The polymerization is preferably carried out in bulk at temperatures of from 90° to 130° C., in the presence of from 0.1 to 0.5 per cent by weight of a per-oxygen compound, e. g. benzoyl peroxide, as polymerization catalyst.

The properties of the copolymeric product are frequently improved by heating the same under vacuum to remove traces of volatile ingredients such as unreacted monomeric compounds, although such devolatilization procedure is not necessary in practice of the invention to produce copolymers having the improved properties herein described.

The following example illustrates a way in which the principle of the invention has been applied, but is not to be construed as limiting the invention.

EXAMPLE

In a series of experiments an ar-dimethylstyrene, i. e. 3,4-dimethylstyrene, was admixed with para-chlorostyrene in the proportions indicated in runs 1 and 2, in the following table and the mixtures were polymerized by heating the same at a temperature of 125° C. for a period of four days. The solid polymeric product was then removed, crushed to form granules of a size suitable for molding and was molded into standard test pieces. The test pieces were used in determining in the usual way, the tensile strength in pounds per square inch cross section; the impact strength in inch pounds of energy applied by a blow to cause breakage; and the heat-distortion temperature in degrees centigrade. It may be mentioned that, except for size of the test piece, the methods used in determining the impact strength and the heat-distortion temperature are similar to those described in A. S. T. M. D256—34T and A. S. T. M. D48—33, respectively. The following table states the per cent by weight of para-chlorostyrene in each mixture subjected to polymerization and gives the foregoing properties of the polymerized product. For purposes of comparison similar properties for polystyrene (run 4) and for poly-3,4-dimethylstyrene (run 3), prepared under like polymerization conditions are included in the table.

Table

| Run No. | Percent 3,4-dimethylstyrene | Percent p-chlorostyrene | Tensile Strength, lbs. per sq. in. | Impact Strength, in lbs. | Heat Distortion Temp., °C. |
|---|---|---|---|---|---|
| 1 | 99.5 | 0.5 | 7,200 | 1.8 | 90 |
| 2 | 99.0 | 1.0 | 6,600 | 2.0 | 110 |
| 3 | 100 | 0 | 5,600 | 1.3 | 83 |
| 4 | 100 (styrene) | 0 | 5,400 | 0.9 | 80 |

Other modes of applying the principle of the invention may be employed instead of those explained, change being made as regards the products herein disclosed, provided the compounds stated by any of the following claims or the equivalent of such stated compounds be employed.

I claim:

1. A solid thermoplastic copolymer of from 97 to 99.5 per cent by weight 3,4-dimethylstyrene and from 3 to 0.5 per cent of para-chlorostyrene.

2. A solid thermoplastic copolymer of 99 per cent by weight 3,4-dimethylstyrene and 1 per cent of parachlorostyrene.

ROBERT R. DREISBACH.

REFERENCES CITED

The following references are of record in the file of this patent:

UNITED STATES PATENTS

| Number | Name | Date |
|---|---|---|
| 2,366,007 | D'Alelio | Dec. 26, 1944 |
| 2,398,736 | Dreisbach | Apr. 16, 1946 |

FOREIGN PATENTS

| Number | Country | Date |
|---|---|---|
| 593,519 | Great Britain | Oct. 20, 1947 |
| 598,069 | Great Britain | Feb. 10, 1948 |
| 598,558 | Great Britain | Feb. 20, 1948 |